United States Patent
Newton

(10) Patent No.: US 11,418,482 B2
(45) Date of Patent: *Aug. 16, 2022

(54) DYNAMIC BINDING AND LOAD DETERMINATION IN A CONTENT DELIVERY NETWORK (CDN)

(71) Applicant: Level 3 Communications, LLC, Broomfield, CO (US)

(72) Inventor: Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,678

(22) Filed: Aug. 16, 2021

(65) Prior Publication Data

US 2021/0377209 A1  Dec. 2, 2021

Related U.S. Application Data

(63) Continuation of application No. 16/882,930, filed on May 26, 2020, now Pat. No. 11,102,168, which is a continuation of application No. 15/721,500, filed on Sep. 29, 2017, now Pat. No. 10,673,805.

(51) Int. Cl.
| | |
|---|---|
| *H04L 61/4511* | (2022.01) |
| *H04L 67/02* | (2022.01) |
| *H04L 67/1004* | (2022.01) |
| *H04L 61/25* | (2022.01) |
| *H04L 61/3015* | (2022.01) |
| *H04L 61/50* | (2022.01) |
| *H04L 101/355* | (2022.01) |

(52) U.S. Cl.
CPC .......... *H04L 61/4511* (2022.05); *H04L 61/25* (2013.01); *H04L 61/3025* (2013.01); *H04L 61/50* (2022.05); *H04L 67/02* (2013.01); *H04L 67/1004* (2013.01); *H04L 2101/355* (2022.05)

(58) Field of Classification Search
CPC ..... H04L 61/1511; H04L 61/20; H04L 61/25; H04L 61/3025; H04L 61/3055; H04L 67/02; H04L 67/1004; H04L 67/1031
USPC ...................................................... 709/223
See application file for complete search history.

(56) References Cited

U.S. PATENT DOCUMENTS

| | | |
|---|---|---|
| 2002/0097724 A1 | 7/2002 | Halme et al. |
| 2004/0194102 A1* | 9/2004 | Neerdaels ............. H04L 67/327 718/100 |
| 2009/0276842 A1 | 11/2009 | Yevmenkin et al. |
| 2011/0276679 A1 | 11/2011 | Newton et al. |
| 2012/0066360 A1 | 3/2012 | Ghosh |

(Continued)

OTHER PUBLICATIONS

Extended European Search Report, dated Apr. 29, 2021, Application No. 18863729.2, filed May 31, 2018; 9 pgs.

(Continued)

*Primary Examiner* — Meng Vang

(57) ABSTRACT

A content provider has a plurality of content provider domain names, and a content delivery network (CDN) allocates a plurality of CDN domain names to the particular content provider. The content provider domain names are mapped to the CDN domain names. CDN domain names are bound to corresponding CDN clusters. The binding of the of CDN domain names to corresponding CDN clusters is modified.

24 Claims, 11 Drawing Sheets

(56) References Cited

U.S. PATENT DOCUMENTS

| | | | |
|---|---|---|---|
| 2012/0124184 A1 | 5/2012 | Sakata et al. | |
| 2012/0198043 A1 | 8/2012 | Hesketh et al. | |
| 2012/0290693 A1 | 11/2012 | Karasaridis et al. | |
| 2014/0149578 A1* | 5/2014 | Goldman | H04L 45/02 709/224 |
| 2014/0173030 A1 | 6/2014 | Varney et al. | |
| 2014/0173061 A1* | 6/2014 | Lipstone | G06F 9/5055 709/220 |
| 2014/0173066 A1 | 6/2014 | Newton et al. | |
| 2014/0173067 A1 | 6/2014 | Newton et al. | |
| 2014/0344400 A1 | 11/2014 | Varney et al. | |
| 2015/0046593 A1 | 2/2015 | Newton | |
| 2015/0281367 A1 | 10/2015 | Nygren | |
| 2019/0104103 A1 | 4/2019 | Newton | |
| 2020/0287864 A1 | 9/2020 | Newton | |

OTHER PUBLICATIONS

International Search Report and Written Opinion of the International Searching Authority, dated Aug. 9, 2018, Int'l Appl. No. PCT/US18/035381, Int'l Filing Date May 31, 2018; 16 pgs.

Barbir, A. et al., "Known CDN Request-Routing Mechanisms draft-cain-cdnp-known-request-routing-03.txt", Internet Engineering Task Force, IETF; StandardWorkingDraft, Internet Society (ISOC) Geneva, Switzerland; No. 3 Nov. 1, 2001, 16 pgs.

Douglis, F. et al., "Known Mechanisms for Content Internetworking draft-douglis-cdi-known-mech-00.txt", Internet Engineering Task Force, IETF; StandardWorkingDraft, Internet Society (ISOC), Geneva Switzerland Nov. 8, 2001, 26 pgs.

European Examination Report, dated Mar. 11, 2022, Application No. 18863729.2, filed May 31, 2018; 6 pgs.

* cited by examiner

| SUPERNAME ID | <CLUSTER,VIP> PAIRS |
|---|---|
| SUPERNAME 1 | SET OF <CLUSTER, VIP> PAIRS FOR SUPERNAME 1 |
| ... | ... |
| SUPERNAME K | SET OF <CLUSTER, VIP> PAIRS FOR SUPERNAME K |

| <CLUSTER,VIP> PAIR | SUPERNAME IDs |
|---|---|
| <C1,VIP1> | SUPERNAME IDs |
| <C1,VIP2> | SUPERNAME IDs |
| ... | ... |
| <CK, VIPJ> | SUPERNAME IDs |

© Level 3 Communications, LLC. All Rights Reserved. Proprietary and Confidential until published as patent application or issued patent.

| SUPERNAME ID | SUBSCRIBER HOSTNAMES |
|---|---|
| SUPERNAME 1 | SET OF SUBSCRIBER HOSTNAMES FOR SUPERNAME 1 |
| ... | ... |
| SUPERNAME K | SET OF SUBSCRIBER HOSTNAMES FOR SUPERNAME K |

| SUBSCRIBER HOSTNAME | SUPERNAMES |
|---|---|
| SUBSCRIBER HOSTNAME 1 | SUPERNAME #1 |
| SUBSCRIBER HOSTNAME 2 | SUPERNAME # |
| ... | ... |
| SUBSCRIBER HOSTNAME J | SUPERNAME X |

© Level 3 Communications, LLC. All Rights Reserved. Proprietary and Confidential until published as patent application or issued patent.

DYNAMIC BINDING AND LOAD DETERMINATION IN A CONTENT DELIVERY NETWORK (CDN)

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

Field of the Invention

This invention relates to content delivery and content delivery networks. More specifically, this invention relates to load determination in content delivery networks (CDNs) with dynamic binding.

BACKGROUND

It is desirable to provide a way to determine or identify which DNS name (which typically corresponds to a property name) is associated with traffic within the context of a CDN where there are multiple names served from a shared VIP across a number of locations, and where there is insufficient identifying information provided within the request.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 5A-5D depict aspects of mapping structures according to exemplary embodiments hereof;

DETAILED DESCRIPTION OF THE Presently Preferred Exemplary Embodiments

Glossary

As used herein, unless used otherwise, the following terms or abbreviations have the following meanings:

CD means content delivery;
CDN or CD network means content delivery network;
CNAME means Canonical Name;
DNS means domain name system;
IP means Internet Protocol;
IPv4 means Internet Protocol Version 4;
IPv6 means Internet Protocol Version 6; and
IP address means an address used in the Internet Protocol, including both IPv4 and IPv6, to identify electronic devices such as servers and the like.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

DESCRIPTION

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

A content provider that uses a CDN may be referred to as a CDN subscriber or customer.

Figure 1:
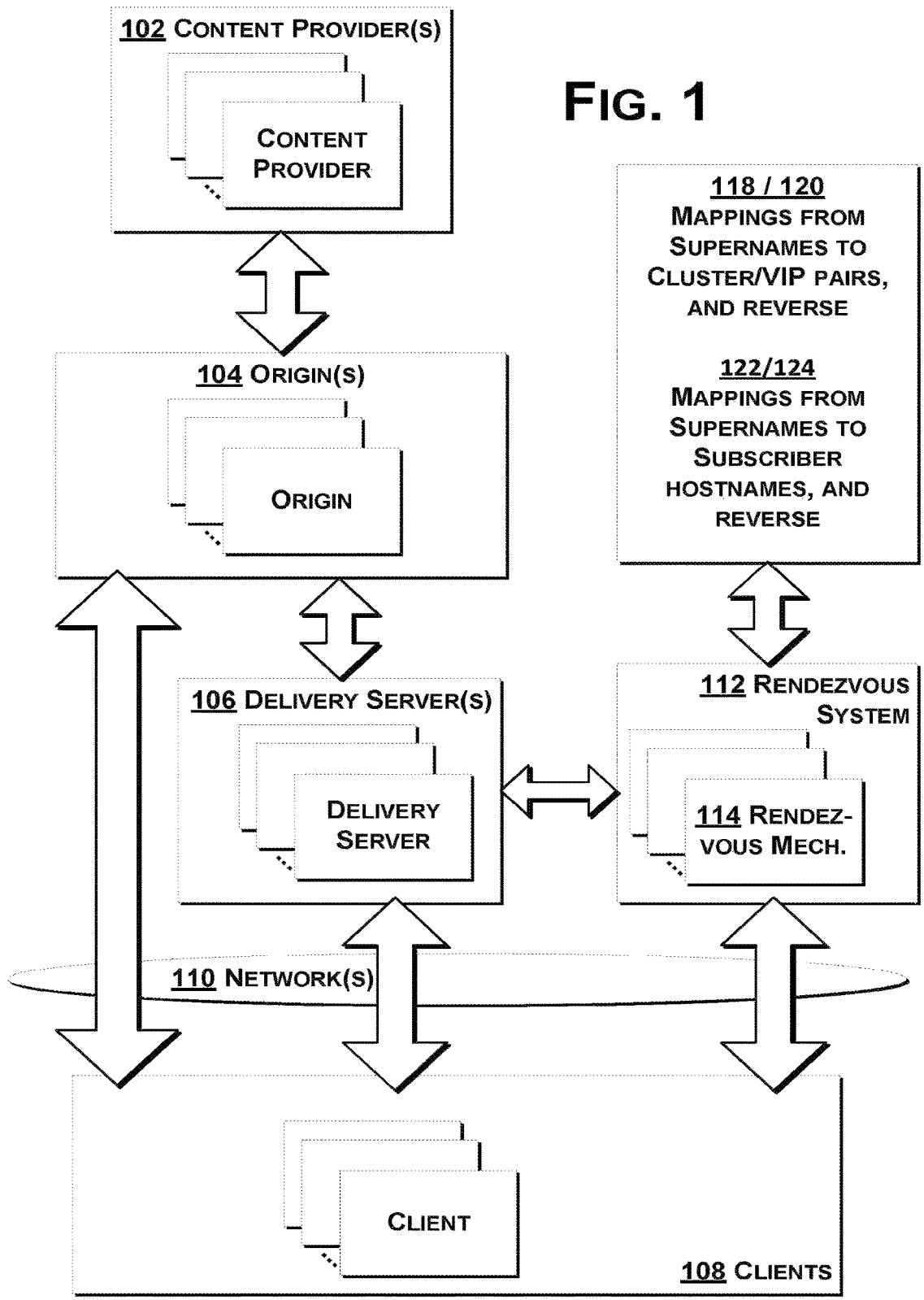
FIG. 1 depicts aspects of a content delivery network (CDN) according to exemplary embodiments hereof.

FIG. 1 shows aspects of an exemplary CDN in which one or more content providers (or subscribers) 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches.

Figure 2:
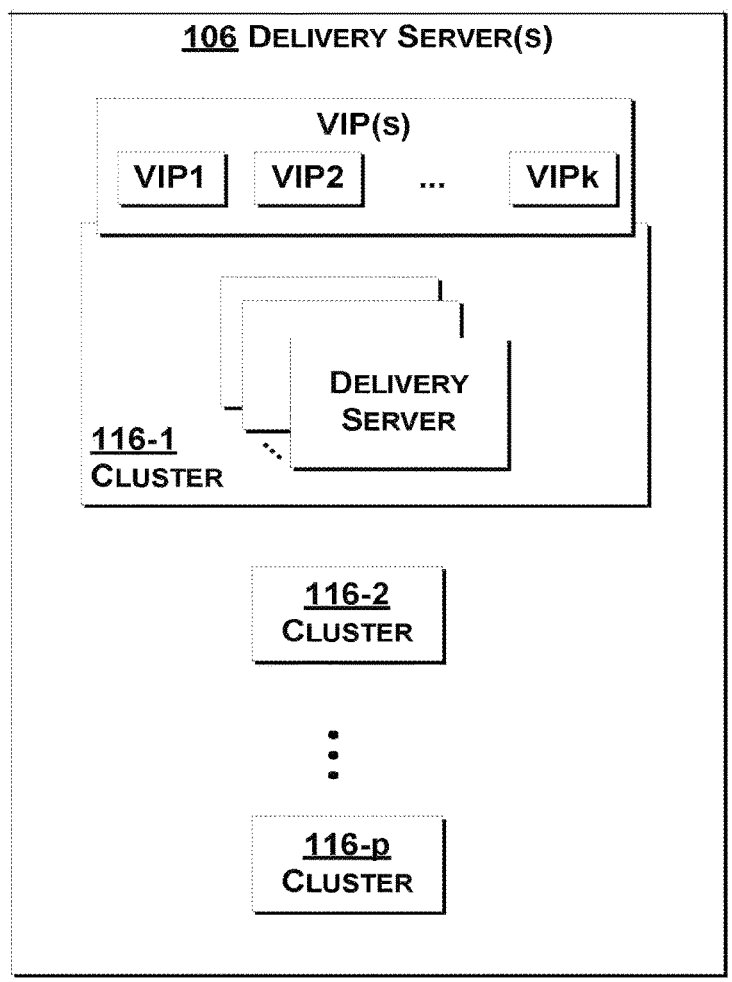
FIG. 2 depicts aspects of a multi-VIP cluster according to exemplary embodiments hereof.

As shown in FIG. 2, the delivery services 106 preferably form clusters 116, with each cluster comprising one or more delivery services (or servers) 106. A cluster may be a logical cluster or a physical cluster. Preferably a local mechanism (e.g., a load balancing mechanism) ensures that exactly one service instance (e.g., machine) in the cluster will respond to each unique service request at the cluster. U.S. Pat. No. 8,015,298 titled "Load Balancing Cluster," filed Feb. 23, 2009, issued Sep. 6, 2011 (the entire contents of which are fully incorporated herein by reference for all purposes) describes various exemplary approaches to ensure that a service instance in a cluster will respond to each unique service request.

A CDN provider typically maintains and operates content servers or server clusters (groups of multiple servers), e.g., delivery servers 106, at multiple locations in and around the CDN. The servers or server clusters may, e.g., be located at numerous different geographic regions (e.g., metropolitan areas) so that content can be stored proximate to users who request the content. As noted above, a CDN often includes servers at the so-called edge of the network (e.g., so-called "edge servers") and servers within the core of the network (e.g., so-called "origin servers"). Origin servers may store or retrieve content and furnish the content to the edge servers, which may in turn cache the content for later distribution.

One or more intermediate tiers of servers may be used between the origin servers and the edge servers.

Each cluster 116 is addressable by one or more virtual IP addresses (or VIPs). For example, as shown in FIG. 2, the cluster 116-1 is addressable by the k VIPs (VIP1, VIP2, . . . VIPk). A virtual address may correspond to or be a physical address. For example, a VIP may be (or correspond to) a physical address (e.g., for a single machine cluster). It should be appreciated that the term VIP is used in this description as an example of a virtual address (for an IP based system). In general any kind of virtual addressing scheme may be used and is contemplated herein. Unless specifically stated otherwise, the term VIP is intended as an example of a virtual address, and the system is not limited to or by IP based systems or systems with IP addresses and/or VIPs. As should be appreciated, a logical cluster may be formed from one or more physical clusters. Where some physical clusters are each addressable by only a single VIP, multiple physical clusters at a location may be considered to be a single logical cluster. In these cases (single VIP per physical cluster), the rendezvous system may provide the set of VIPs for the member clusters of the logical cluster, and each client request will be directed to a physical cluster in the logical cluster. As should be appreciated, this approach (a single VIP per physical cluster) may not be a preferred implementation, as it likely significantly limits the amount of serving capacity in a location.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Content associated with or provided by a particular content provider or subscriber may be referred to as a property. A property may be, e.g., a website and related content, and typically comprises multiple resources. A CDN may provide one or more properties associated with and/or on behalf of one or more content providers. That is, a CDN may serve content on behalf of multiple subscribers, and each particular subscriber may have multiple resources or properties associated therewith that are to be served by the CDN. A content provider may have more than one property, and thus a CDN may serve/provide one or more properties associated with and/or on behalf of a particular content provider.

Exemplary CDNs are described in U.S. Pat. Nos. 8,060,613 and 8,825,830, the entire contents of both of which are fully incorporated herein by reference in their entirety and for all purposes.

With reference again to FIG. 1, client requests (e.g., for content) may be associated with delivery server(s) 106 by a rendezvous system 112 comprising one or more rendezvous mechanism(s) 114, e.g., in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., DNS processing of a domain name associated with the particular client request).

As should be appreciated, typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 (or clusters 116) to deal with that particular request. The "best" or "optimal" delivery server(s) 106 (or cluster(s) 116) may be one(s) that is (are) close to the client (by some measure of network cost) and that is (are) not overloaded. Preferably the chosen delivery server(s) 106 (or cluster(s) 116) (i.e., the delivery server(s) or cluster(s) chosen by the rendezvous system 112 for a client request) can deliver the requested content to the client or can direct the client, somehow and in some manner, to somewhere where the client can try to obtain the requested content. A chosen delivery server 106 (or cluster 116) need not have the requested content at the time the request is made, even if that chosen delivery server 106 (or cluster 116) eventually serves the requested content to the requesting client.

Domain and Binding Names, and Dynamic Binding

The resources of a particular CDN subscriber may be associated with multiple subscriber domain names (e.g., host or domain names that the subscriber advertises or somehow provides to its users). That is, a CDN subscriber may have one or more subscriber domain names associated with their resources. Within the CDN, a subscriber may have one or more CDN domain names (sometimes referred to herein as supernames), and a subscriber's domain names are mapped to the subscriber's CDN supernames.

The mapping of subscriber domain names to CDN domain names or supernames may use the DNS canonical name (CNAME) feature. For example, a CDN may associate each subscriber domain name with a CNAME. In that case, DNS resolution of each subscriber domain name subject to CDN service may be configured to map to the corresponding CNAME (supername) assigned by the CDN for that subscriber domain name.

Figure 3A:
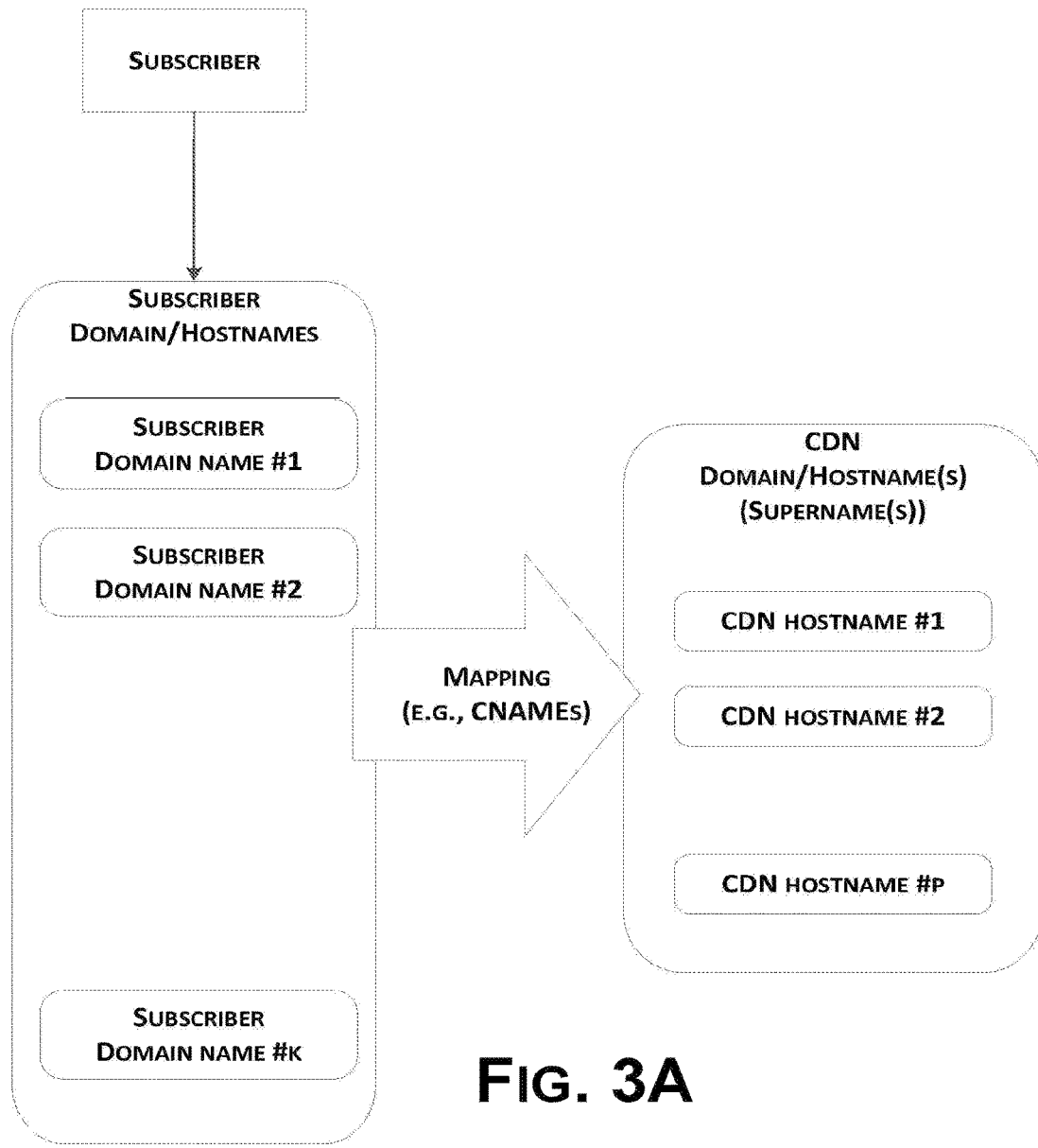
FIGS. 3A-3B depict aspects of mapping subscriber domain names to CDN domain names according to exemplary embodiments hereof.
Figure 3B:
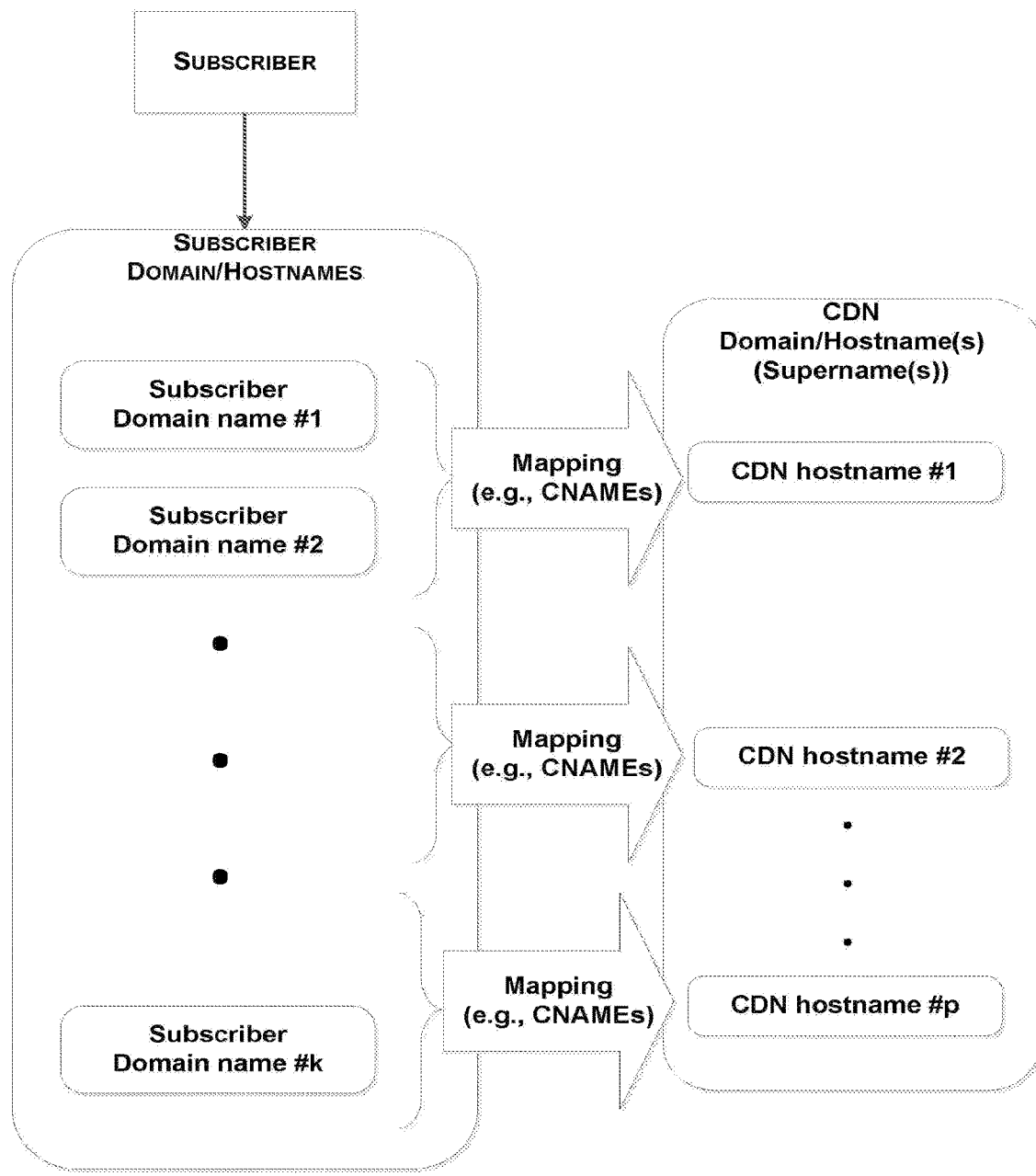

Thus, as shown in the example in FIGS. 3A-3B, a subscriber has multiple (k) subscriber domain names associated therewith. These subscriber domain names are mapped (e.g., using CNAMEs) to one or more CDN domain/hostnames (i.e., to one or more supernames). In the example in FIG. 3, the k subscriber domain names are mapped via CNAMEs to p supernames. Note that each particular subscriber domain name is mapped to only one supername. While the number (k) of subscriber domain names may be in the thousands for some subscribers, the number (p) of supernames per subscriber is typically much less (e.g., less than ten).

As should be appreciated, the mapping of subscriber domain names (hostnames) to supernames is typically performed by the subscriber, outside of the CDN and typically outside of the control of the CDN. However, in preferred implementations, all subscriber domain names are registered with the CDN.

As an example, a CDN subscriber may associate the subscriber domain name "images.subscriber.com" with that subscriber's resources. The CDN may use the CNAME, (supername) "images.subscriber.com.cdn.fp.net" (or "cust1234.cdn.fp.net" or the like) with the subscriber domain name "images.subscriber.com." In this case there is one subscriber domain name and one supername (so k=p).

When the DNS system (e.g., a client DNS) resolves the subscriber domain name "images.subscriber.com" (in the example above), because of the CNAME, the DNS will be directed to resolve "images.subscriber.com.cdn.fp.net" (which will preferably be resolved using the CDN's rendezvous system 112 and associated rendezvous mechanisms 114).

As another example, a CDN subscriber may associate 1,000 subscriber domain names (domain 1.subscriber.com, domain_2.subscriber.com, . . . , domain_1000.subscriber.com) with that subscriber's resources. The subscriber domain names may map to four CDN domain names (supernames) (e.g., (i) domains_A.subscriber.com.CDN.fp.net, (ii) domains_B.subscriber.com.CDN.fp.net, (iii) domains_C.subscriber.com.CDN.fp.net, and (iv) domains_D.subscriber.com.CDN.fp.net), where each subscriber domain name domain_j.subscriber.com maps to one of the supernames. In this case there are a thousand subscriber domain names and four supernames (so k>>p). In this example, when the DNS system (e.g., a client DNS) resolves the subscriber domain name "domain_x.subscriber.com" for some value x in {1 . . . 1000}, because of the CNAME, the DNS will be directed to resolve the corresponding supername (e.g., "domains_y.subscriber.com.CDN.fp.net" for some value y in {A, B, C, D} (which will preferably be resolved using the CDN's rendezvous system 112 and associated rendezvous mechanisms 114).

Figure 4:
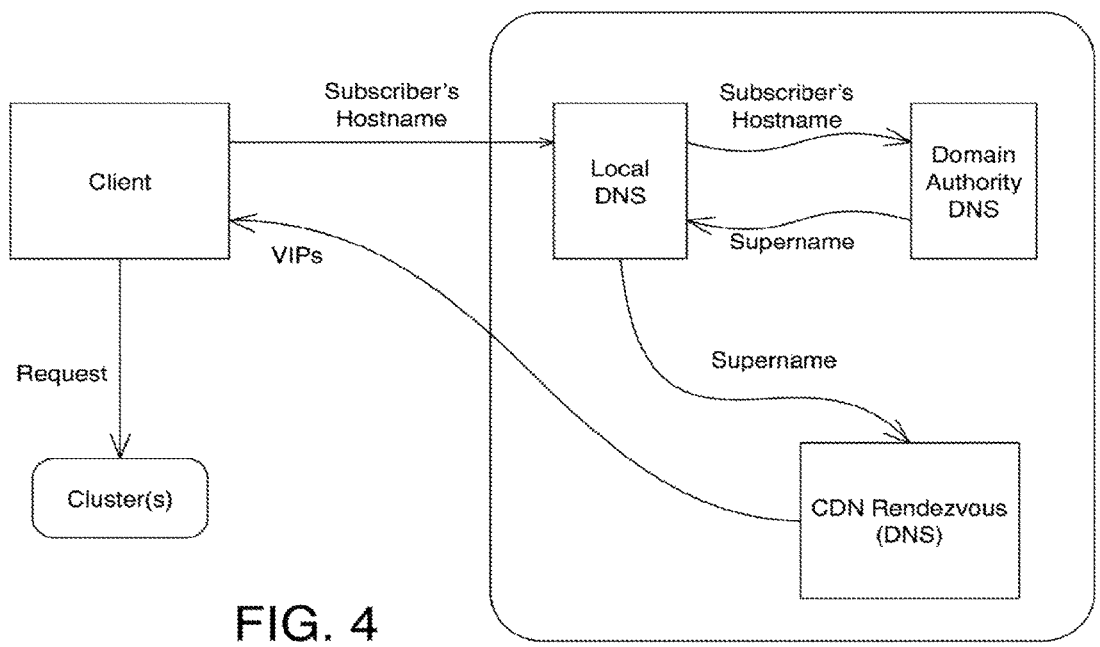
FIG. 4 depicts aspects of domain name resolution according to exemplary embodiments hereof.

As shown, e.g., in FIG. 4, a client's request to resolve a subscriber's hostname is directed (e.g., via a domain authority DNS) to the CDN's rendezvous system 112 as a resolution of the corresponding supername (CNAME). For example, the client request to resolve "www.example.com" is sent from the client's local DNS to a DNS server that is authoritative for the domain "example.com." That authoritative DNS server effectively converts "www.example.com" to a supername (e.g., www.example.com.c.fp.net") via a CNAME. The client's local DNS server then attempts to resolve the supername. The CDN's rendezvous system 112 will direct a client request to an appropriate delivery server 106 to handle the request. That is, when a client name resolution request for a subscriber host name is directed to a CDN CNAME (or supername), the supername will be resolved using a CDN DNS service (e.g., in rendezvous system 112) which is authoritative for the CNAME, and the rendezvous service (e.g., a DNS) will return a list of one or more VIPs in the CDN that are suitable for the client to contact in order to consume or obtain the subscriber's service (e.g., for that subscriber's content). Preferably, the rendezvous service will return VIPs that are not only available but have sufficient excess capacity and are in close to the client by some measure of network cost (e.g., network proximity). The requesting client then makes a request from the cluster(s) addressed by one of the VIPs.

Note that a request reaching a delivery server 106 (or cluster) may include the subscriber's domain name, but will not include the CDN supername. For example, using the example names described above, an HTTP request at a CDN server for content at "domain 100.subscriber.com" may be resolved using the CNAME (or supername) "domains_B.subscriber.com.CDN.fp.net." The request received at the CDN server may include the hostname "domain_100.subscriber.com" (e.g., in an HTTP host header), but will not include the CNAME (or supername) "domains_B.subscriber.com.CDN.fp.net."

Each request reaching the CDN originates with a request to a subscriber domain name. However, because of the mapping from subscriber domain names to CDN supernames, a subscriber domain name will likely be different from the name (the supername) submitted to the CDN's rendezvous system (typically the CNAMEd supername for the subscriber's host name defined in the CDN domain).

Once the supername is resolved for a particular client request, the client will then request the resource from the CDN server(s) to which it was directed. However, the client request made to the CDN server 106 will use the CDN domain name (e.g., in a request header or the like).

Thus, the CDN's rendezvous system 112 does not see or know the subscriber hostnames used to make or originate requests, and the CDN's delivery servers 106 or clusters do not see or know the CDN hostnames (supernames) used by the rendezvous system to perform the name resolution and server selection.

Binding is the process of establishing that requests for certain subscriber services (or other internal requests) will be available at certain endpoints in the CDN. Aspects of dynamic binding are described in U.S. Published Patent Application No. 20110276679, filed May 4, 2010, as application Ser. No. 12/773,086, titled "Dynamic Binding For Use In Content Distribution," the entire contents of which are hereby fully incorporated herein by reference for all purposes.

As noted above with respect to FIG. 2, a CDN cluster 116 may be addressable by multiple VIPs, and the rendezvous system 112 directs a client request to a CDN cluster 116 using a VIP associated with that cluster.

The rendezvous system 112 may be implemented, at least in part, as described in U.S. Pat. No. 7,822,871 titled "Configurable Adaptive Global Traffic Control And Management," filed Sep. 30, 2002, issued Oct. 26, 2010.

Different CDN customers (or properties) may use different VIPs for the same cluster, i.e., a CDN may use a distinctly unique VIP for each property. However, in general, M VIPs may be used for N properties, where N>>M.

To recap, a CDN subscriber may have multiple domain or host names and a subscriber may be assigned one or more CDN domain or host names (i.e., one or more supernames). A CDN subscriber's multiple domain/host names are mapped or bound (e.g., using CNAMEs) to the subscribers one or more supernames. A subscriber's supernames are bound to servers (or clusters) in the CDN.

The use of supernames allows the CDN to change internal CDN mappings or bindings (e.g., from supernames to clusters), thereby to deal with load and/or demand changes for a subscriber's resources. For example, a subscriber may initially be allocated a certain number of clusters for some of its content. If demand for that content increases, the CDN can allocate more clusters to that content by binding more clusters to the supername associated with that content. Similarly, as demand drops, the number of clusters bound to a supername may be reduced. In some cases it may be desirable to change the mapping from subscriber domain names to supernames or even to add one or more supernames for a subscriber.

However, as noted above, the CDN's rendezvous system 112 knows about supernames and is invoked to resolve supernames (see, e.g., FIG. 4). The CDN's rendezvous system 112 does not know which subscriber hostname was used to cause a particular supername resolution. And, conversely, when a client makes a request at a CDN cluster (addressed by a VIP), the request may include the subscriber hostname, but not the CDN supername).

It is desirable to provide a way to determine or identify which DNS name is associated with traffic within the context of a CDN where there are multiple names served from a shared VIP across a number of locations, and where there is insufficient identifying information provided within the request. This information may be used to provide load information to the rendezvous system, allowing it to make adjustments to the bindings, if needed.

With reference again to FIG. 2, in exemplary embodiments hereof, some of the clusters 116 are designated as so-called tracking clusters.

Each supername is assigned an identifier or registration number (referred to herein as the supername's number), e.g., sequentially from 1 to k. The j-th supername is mapped to the clusters/VIPs using a unique mapping from j to the p VIPs associated with each cluster. For example, if j is 21,347 (i.e., this is supername number 21,347), then the supername may use VIP #2 on cluster #1, VIP #1 on cluster #2, VIP #3 on cluster #3, VIP #4 on cluster #4, and VIP #7 on cluster #5.

In general, with this scheme, for a supername with supername number $x_1 x_2 \ldots x_r$, the supername uses or resolves to VIP #$x_1$ on cluster #1, VIP #$x_2$ on cluster #2, etc.

It should be appreciated that not all clusters need have or use multiple VIPs for identification purposes (i.e., not all clusters need to be so-called tracking clusters), but the more that do, the better the likelihood of correctly identifying the a supername. For instance, if a metro has 10 clusters within a particular binding, it may be that there is need to identify up to 10,000 supernames which requires 4 tracking clusters (assuming 10 VIPs per tracking cluster). Such a system may have two groups of identifying clusters (i.e., two cluster groups) at that location, with 2 clusters left over. The two clusters that are not used may just have single VIPs. Preferably all clusters would have the same number of VIPs, but that is not required or necessary, and a VIP selection process may handle inconsistent VIP counts.

It should also be appreciated that the mechanism used should not prevent the use of any cluster for a given name. For example, each cluster in the Nth position of each cluster group should ideally have the same number of VIPs available. However, if some cluster cannot, then they should just map the range of VIPs expected to be in that cluster to the number actually available. In an extreme case, a particular cluster may only have a single VIP (e.g., because it housed at an ISP that only provides highly limited address space). Such a cluster should ideally not be considered part of an identifying cluster groups, but could just serve all names from the single VIP. This reduces the ability to identify the supername. For example, if 4 clusters which should have 10 VIPs each are used (for 10,000 properties) but one cluster only has one VIP, then using the other 3 still narrows the set of targets down from 10,000 to 10.

Although the use of at most one VIP per marker cluster is preferred, those of ordinary skill in the art will appreciate and understand, upon reading this description, that the same name may be bound to multiple VIPs at a given marker cluster. Furthermore, a single marker cluster may be used with a large number of VIPs. For example, for 100,000 names (properties), having 50 VIPs at a single marker cluster may be used to the same effect as 10 VIPs at 5 marker clusters.

It should further be appreciated that the process described herein may not guarantee exact supername identification, but it reduces the search space needed to identify supernames.

Note that a different mapping from supername numbers to VIPs may be used. E.g., a hash of the supername number may be used to generate a mapping to VIPs. When a hash is used, the hash may map the supername number to a number in a larger range (i.e., with more digits). For example, if there are on the order of 10,000 supernames, then an exemplary hash function may map the supername to a number in the range 0 to 100,000 or 0 to 1,000,000, etc. This approach may be used to distribute the supername numbers over a larger set of cluster/VIP pairs. For example, the supername numbers 5,432 and 5,433 (out of 10,000) may be hashed to 98,765 and 34,567 (out of 100,000). The distance between the two numbers may make it easier to later distinguish them. If a hash function is used, preferably it distributes its results normally, without clustering.

An exemplary mapping 118 from supernames to sets of cluster/VIP pairs is shown in FIG. 5A. As shown in FIG. 1, the mapping 118 from supernames to sets of cluster/VIP pairs is preferably accessible to the rendezvous system 112, and may be stored or co-located therewith.

Since the VIPs are unique and each VIP is associated with only one cluster, the CDN knows which cluster/VIP pairs are being used and thereby, which supernames are implicated. Since the mapping (118, FIG. 5A) from supernames to cluster/VIP pairs provides a (full or partial) reverse mapping from cluster/VIP pairs to supernames, it can be used to determine one or more supernames that are being used for which subscriber hostnames. This information may then be used to adjust the bindings of those supernames (e.g., to more or fewer clusters).

The system is able to query the rendezvous system 112 for a list of all supernames that use a particular VIP on a given cluster (e.g., VIP x on cluster y). A combination of these queries for multiple VIP/cluster pairs will give multiple lists of supernames, and the intersection of these multiple lists is a candidate list of supernames being used for which subscriber hostnames.

Thus, the system is able to create and maintain two tables, one (122) mapping supernames to subscriber hostnames, and the other (124) mapping subscriber hostnames to supernames.

The system knows the traffic that each subscriber host name is getting, both locally and system wide. Using the mapping tables 122 and/or 124, the system can adjust the bindings associated with a supername based on the load/traffic associated with one or more hostnames.

Figure 6A:
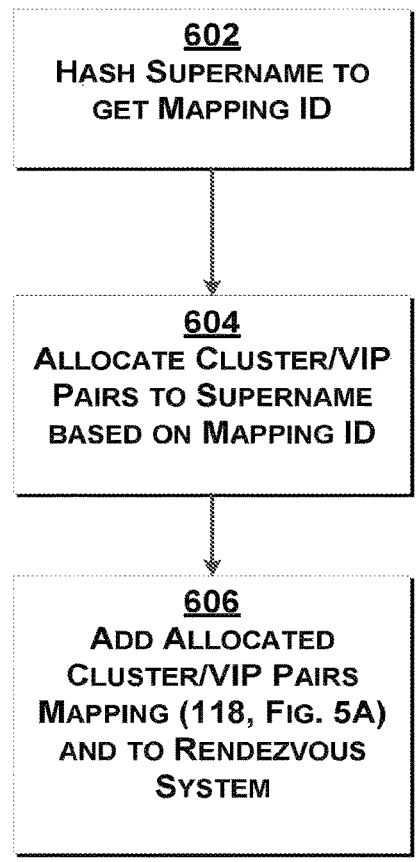
FIGS. 6A-6C are flowcharts showing aspects of the system according to exemplary embodiments hereof.
Figure 6B:
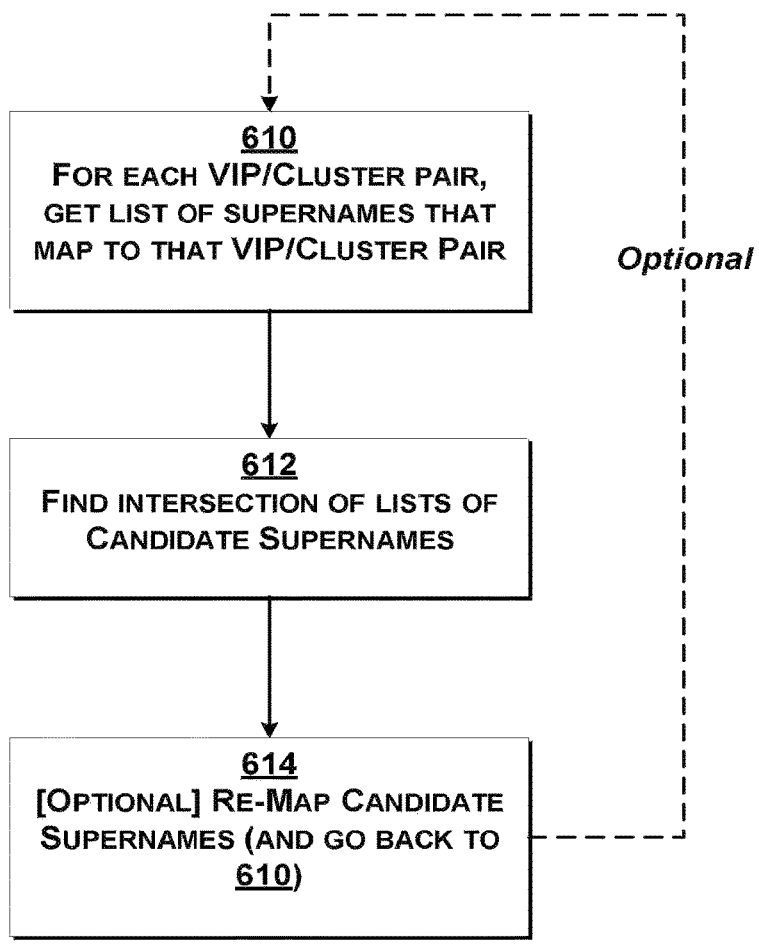
Figure 6C:
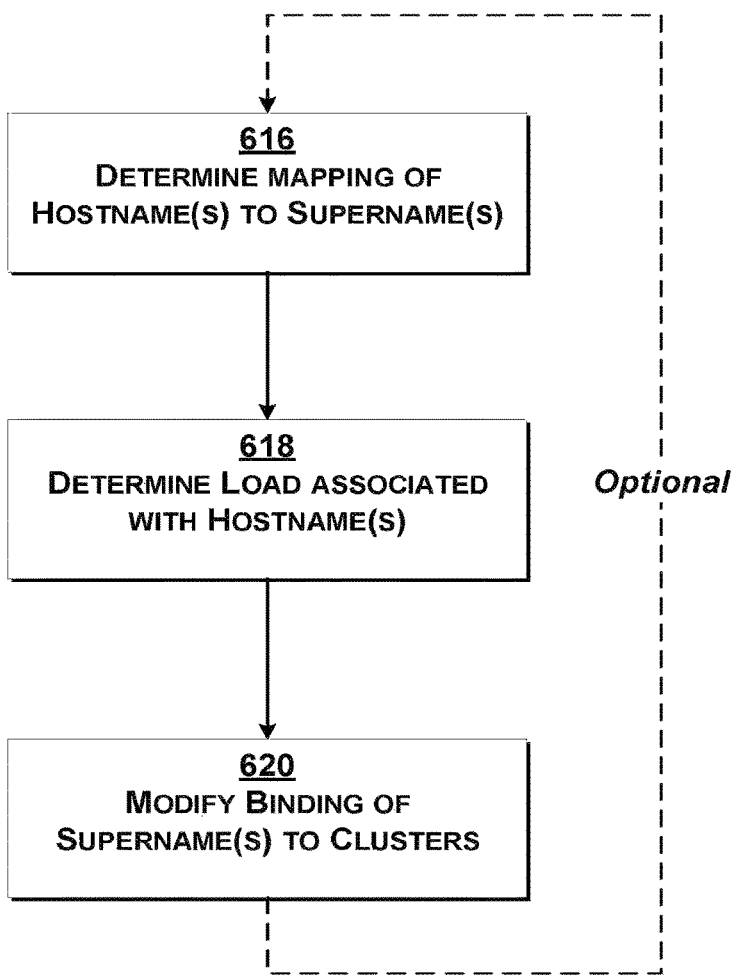

FIGS. 6A-6C are flowcharts showing aspects of the system according to exemplary embodiments hereof.

When a customer/property is added to the CDN (e.g., when a new customer subscribes to the CDN or when an existing customer adds a new property to the CDN), the customer is allocated one or more supernames. Each supername is assigned a new identifier. Identifiers may be assigned in sequential order. As shown in FIG. 6A, when a supername is added to the CDN, the supername identifier is hashed (as described above) to obtain a mapping identifier (at 602). Preferably the range of the mapping identifier is greater than the range of supername identifiers, so as to allow room for growth of the system and to minimize overlap. The system then allocates a set of cluster/VIP pairs to the supername based on the mapping identifier (at 604), as described above, and this mapping is stored in the mapping table 118. For example, the supername number X $(x_1 x_2 \ldots x_r)$ may hash to the mapping identifier $M_1 M_2 \ldots M_s$, where s≥r. In this case, the system allocates a set of cluster/VIP pairs to the supername as follows: {VIP #$M_1$ on cluster #1, VIP #$M_2$ on cluster #2, ... VIP #$M_s$ on cluster #S}. The rendezvous system 112 (e.g., the DNS system) updates its records (at 606) so that requests for the supername will be directed to one or more of the VIPs in the set {VIP #$M_1$; VIP #$M_2$; ... VIP #$M_s$}. As will be appreciated, the rendezvous system provides one or more VIPs to requesting clients, and does not provide any cluster information.

As shown in FIG. 6B, for each VIP/Cluster pair, the system gets a list of supernames that map to that VIP/Cluster pair (at 610). These lists may be obtained from the mapping table 118, or a reverse lookup table may be created and stored that maps VIP/Cluster pairs to supername numbers (120, FIG. 5B). These lists are candidates of supernames, and may require pruning. Accordingly, an intersection of these lists is determined (at 612) to determine a potentially narrower list of candidate supernames.

In some cases, the system may re-map the candidate supernames to a different set of cluster/VIP pairs (at 614), e.g., by adding VIPs to existing clusters or adding new cluster/VIPs. If the candidates are remapped then the system repeats the determination of the candidate lists (as described above with respect to acts 610 and 612).

With reference now to the flowchart in FIG. 6C, the system may determine a mapping of subscriber hostnames to supernames (at 616), as described above. The system may determine the load associated with one or more subscriber hostnames (at 618), and then, if needed, modify the binding of one or more supernames to clusters (at 620). This process may optionally be repeated as needed.

The feedback described herein may be local and/or global. For example, the delivery servers 106 may provide local and/or global information to the CDN (e.g., via reducers and/or collectors, not shown in the drawings). The tracking clusters may provide data and feedback to the CDN (e.g., to the rendezvous system 112 or some other CDN mechanism (s)) in order to build, determine, and/or maintain the various mappings (e.g., 122, 124 from supernames to subscriber hostnames, and reverse).

Computing

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 7:
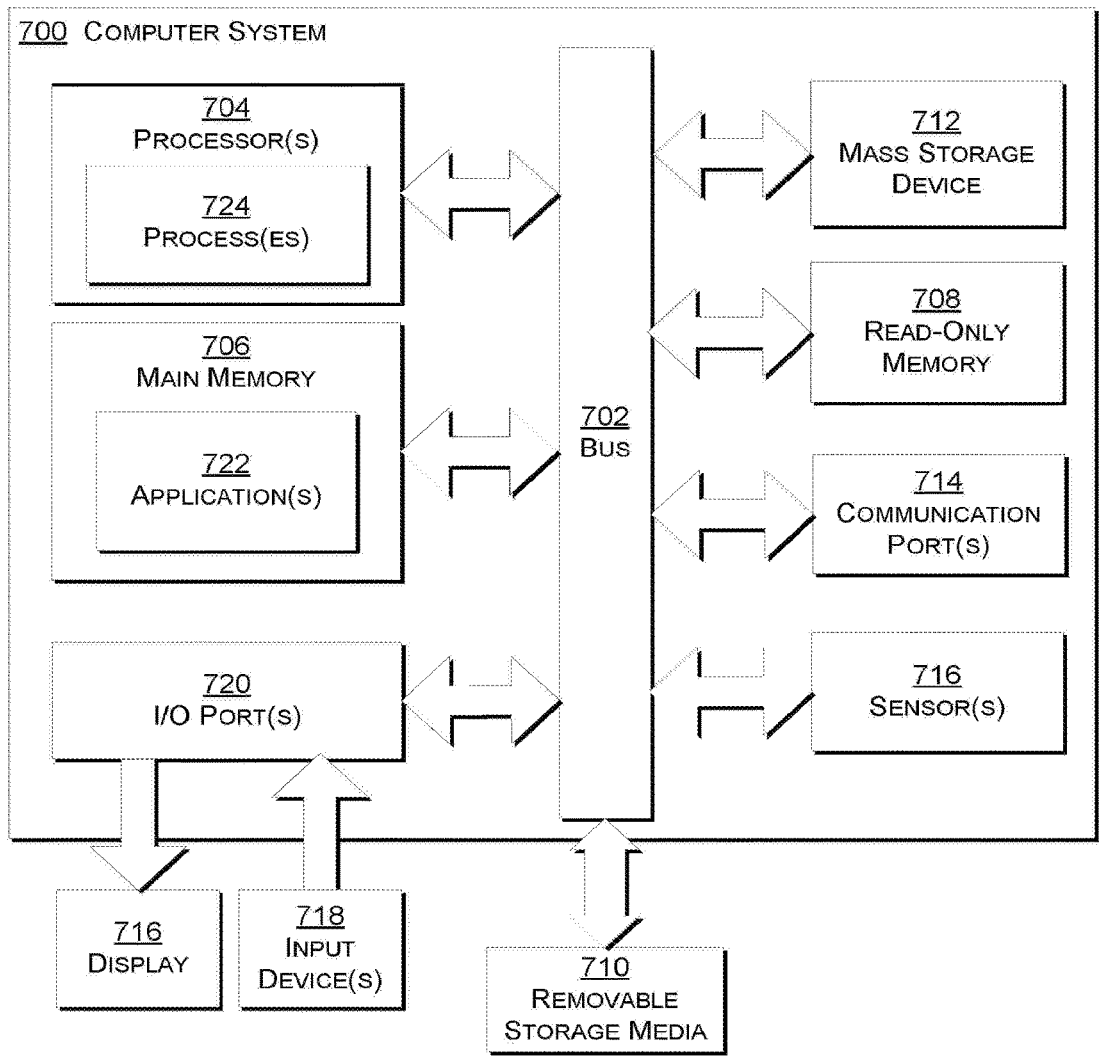
FIG. 7 depicts aspects of computing according to exemplary embodiments hereof.

FIG. 7 is a schematic diagram of a computer system 700 upon which embodiments of the present disclosure may be implemented and carried out.

According to the present example, the computer system 700 includes a bus 702 (i.e., interconnect), one or more processors 704, a main memory 706, read-only memory 708, removable storage media 710, mass storage 712, and one or more communications ports 714. Communication port 714 may be connected to one or more networks by way of which the computer system 700 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 704 can be any known processor, such as, but not limited to, an Intel® Itanium® or Itanium 2® processor (s), AMD® Opteron® or Athlon MP® processor(s), or Motorola® lines of processors, and the like. Communications port(s) 714 can be any of an RS-232 port for use with a modem based dial-up connection, a 10/100 Ethernet port, a Gigabit port using copper or fiber, or a USB port, and the like. Communications port(s) 714 may be chosen depending on a network such as a Local Area Network (LAN), a Wide Area Network (WAN), a CDN, or any network to which the computer system 700 connects. The computer system 700 may be in communication with peripheral devices (e.g., display screen 716, input device(s) 718) via Input/Output (I/O) port 720.

Main memory 706 can be Random Access Memory (RAM), or any other dynamic storage device(s) commonly known in the art. Read-only memory 708 can be any static storage device(s) such as Programmable Read-Only Memory (PROM) chips for storing static information such as instructions for processor 704. Mass storage 712 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 702 communicatively couples processor(s) 704 with the other memory, storage, and communications blocks. Bus 702 can be a PCI/PCI-X, SCSI, a Universal Serial Bus (USB) based system bus (or other) depending on the storage devices used, and the like. Removable storage media 710 can be any kind of external hard-drives, floppy drives, IOMEGA® Zip Drives, Compact Disc—Read Only Memory (CD-ROM), Compact Disc—Re-Writable (CD-RW), Digital Versatile Disk—Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 706 is encoded with application(s) 722 that supports the functionality discussed herein (the application 722 may be an application that provides some or all of the functionality of the CD services described herein, including rendezvous services). Application(s) 722 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 704 accesses main memory 706 via the use of bus 702 in order to launch, run, execute, interpret or otherwise perform the logic instructions of the application(s) 722. Execution of application(s) 722 produces processing functionality of the service related to the application(s). In other words, the process(es) 724 represent one or more portions of the application(s) 722 performing within or upon the processor(s) 704 in the computer system 700.

It should be noted that, in addition to the process(es) 724 that carries (carry) out operations as discussed herein, other embodiments herein include the application 722 itself (i.e., the un-executed or non-performing logic instructions and/or data). The application 722 may be stored on a computer readable medium (e.g., a repository) such as a disk or in an optical medium. According to other embodiments, the application 722 can also be stored in a memory type system such as in firmware, read only memory (ROM), or, as in this example, as executable code within the main memory 706 (e.g., within Random Access Memory or RAM). For example, application 722 may also be stored in removable storage media 710, read-only memory 708 and/or mass storage device 712.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Thus is provided a way to determine or identify which DNS name (which typically corresponds to a property name) is associated with traffic within the context of a CDN where there are multiple names served from a shared VIP across a number of locations, and where there is insufficient identifying information provided within the request. Those of ordinary skill in the art will appreciate and understand, upon reading this description, that this may be particularly useful with a DNS-based rendezvous system, where identifying information within a request may not be sufficient to associate the traffic (load) experienced within the delivery nodes with the names seen by a DNS-based rendezvous system, e.g., as the result of using a CNAME or CNAME chain.

As used herein, including in the claims, the term "content" means, without limitation, any kind of data, in any form, regardless of its representation and regardless of what it represents. Content may include, without limitation, static and/or dynamic images, text, audio content, including streamed audio, video content, including streamed video, web pages, computer programs, documents, files, and the like. Some content may be embedded in other content, e.g., using markup languages such as hypertext markup language (HTML) and extensible markup language (XML). Content includes content which is created or formed or composed specifically in response to a particular request. The term "resource" is sometimes used herein to refer to content.

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A computer-implemented method, in a content delivery (CD) network, wherein said CD network (CDN) delivers content on behalf of multiple content providers, and wherein a particular content provider of said multiple content providers has a first plurality of content provider domain names associated therewith, and wherein said CDN allocates a first plurality of CDN domain names to said particular content provider, and wherein said first plurality of content provider domain names are mapped to said first plurality of CDN domain names, wherein said CDN comprises a plurality of CDN clusters, and wherein at least some of said CDN clusters are marker clusters, the method comprising:
   (A) maintaining a binding of said first plurality of CDN domain names to corresponding CDN clusters, wherein each of said first plurality of CDN domain names is bound to at least one CDN cluster;
   (B) maintaining, for at least some of said marker clusters, a first mapping; and then
   (C) determining a second mapping, based on at least correlating the first plurality of content provider domain names included in one or more content requests received at one or more marker clusters with the one or more marker clusters receiving such requests and using the first mapping to correlate the first plurality of content provider domain names to the first plurality of CDN domain names; and
   (D) determining an amount of traffic or load associated with a particular domain name of said particular content provider; and
   (E) based at least in part on said amount of traffic or load determined in (D) and the second mapping, modifying said binding of said first plurality of CDN domain names to corresponding CDN clusters.

2. The method of claim 1, wherein said plurality of content provider domain names are mapped in a many-to-one relationship to said plurality of CDN hostnames.

3. The method of claim 1, wherein said plurality of content provider domain names are mapped using canonical names (CNAMEs) to said plurality of CDN domain names.

4. The method of claim 1, wherein each of said first plurality of CDN domain names has a corresponding unique identifier associated therewith.

5. The method of claim 4, wherein a set of cluster/VIP pairs associated with each CDN domain name is determined based on a hash function applied to the unique identifier associated with that CDN domain name.

6. The method of claim 1, wherein a set of cluster/VIP pairs associated with each CDN domain name is unique for each CDN domain name.

7. The method of claim 1, wherein each CDN domain name has a unique VIP at each of a plurality of clusters.

8. The method of claim 1, wherein the binding of said first plurality of CDN domain names to corresponding CDN clusters is maintained in a rendezvous system of said CDN.

9. The method of claim 1, wherein, for said determining in (C), the one or more requests comprise one or more requests for content of said particular content provider.

10. The method of claim 1, wherein said modifying in (E) increases the number of CDN clusters associated with a particular CDN domain name.

11. The method of claim 1, wherein said modifying in (E) decreases the number of CDN clusters associated with a particular CDN domain name.

12. The method of claim 1, wherein at least one of said CDN clusters comprises multiple marker clusters.

13. A nontransitory article of manufacture comprising a computer-readable medium having program instructions stored thereon, the program instructions, operable on a computer system in a content delivery network (CDN), said computer system implementing at least one content delivery (CD) service,
   wherein said CD network (CDN) delivers content on behalf of multiple content providers, and
   wherein a particular content provider of said multiple content providers has a first plurality of content provider domain names associated therewith, and wherein said CDN allocates a first plurality of CDN domain names to said particular content provider, and wherein said first plurality of content provider domain names are mapped to said first plurality of CDN domain names, wherein said CDN comprises a plurality of CDN clusters, and wherein at least some of said CDN clusters are marker clusters,
   wherein execution of the program instructions by one or more processors of said computer system causes the one or more processors to carry out the acts of:
   (A) maintaining a binding of said first plurality of CDN domain names to corresponding CDN clusters, wherein each of said first plurality of CDN domain names is bound to at least one CDN cluster;
   (B) maintaining, for at least some of said marker clusters, a first mapping; and then
   (C) determining a second mapping, based on at least correlating the first plurality of content provider domain names included in one or more content requests received at one or more marker clusters with the one or more marker clusters receiving such requests and using the first mapping to correlate the first plurality of content provider domain names to the first plurality of CDN domain names; and
   (D) determining an amount of traffic or load associated with a particular domain name of said particular content provider; and
   (E) based at least in part on said amount of traffic or load determined in (D) and the second mapping, modifying said binding of said first plurality of CDN domain names to corresponding CDN clusters.

14. The nontransitory article of manufacture of claim 13, wherein said plurality of content provider domain names are mapped in a many-to-one relationship to said plurality of CDN hostnames.

15. The nontransitory The article of manufacture of claim 13, wherein said plurality of content provider domain names are mapped using canonical names (CNAMEs) to said plurality of CDN domain names.

16. The nontransitory article of manufacture of claim 13, wherein each of said first plurality of CDN domain names has a corresponding unique identifier associated therewith.

17. The nontransitory article of manufacture of claim 16, wherein a set of cluster/VIP pairs associated with each CDN domain name is determined based on a hash function applied to the unique identifier associated with that CDN domain name.

18. The nontransitory article of manufacture of claim 13, wherein a set of cluster/VIP pairs associated with each CDN domain name is unique for each CDN domain name.

19. The nontransitory article of manufacture of claim 13, wherein each CDN domain name has a unique VIP at each of a plurality of clusters.

20. The nontransitory article of manufacture of claim 13, wherein the binding of said first plurality of CDN domain names to corresponding CDN clusters is maintained in a rendezvous system of said CDN.

21. The nontransitory article of manufacture of claim 13, wherein, for said determining in (C), the one or more requests comprise one or more requests for content of said particular content provider.

22. The nontransitory article of manufacture of claim 13, wherein at least one of said CDN clusters comprises multiple marker clusters.

23. A device in a content delivery network (CDN), wherein said CDN delivers content on behalf of at least one content provider, said device implementing a content delivery (CD) service, wherein said CD network (CDN) delivers content on behalf of multiple content providers, and wherein a particular content provider of said multiple content providers has a first plurality of content provider domain names associated therewith, and wherein said CDN allocates a first plurality of CDN domain names to said particular content provider, and wherein said first plurality of content provider domain names are mapped to said first plurality of CDN domain names, wherein said CDN comprises a plurality of CDN clusters, and wherein at least some of said CDN clusters are marker clusters, wherein the device comprises:

at least one processor; and memory, operatively connected to the at least one processor storing instructions that, when executed by the at least one processor, cause the device to:

(a) maintain a binding of said first plurality of CDN domain names to corresponding CDN clusters, wherein each of said first plurality of CDN domain names is bound to at least one CDN cluster;

(b) maintain, for at least some of said marker clusters, a first mapping; and then (c) determine a second mapping, based on at least correlating the first plurality of content provider domain names included in one or more content requests received at one or more marker clusters with the one or more marker clusters receiving such requests and using the first mapping to correlate the first plurality of content provider domain names to the first plurality of CDN domain names; and (d) determine an amount of traffic or load associated with a particular domain name of said particular content provider; and (e) based at least in part on said amount of traffic or load determined in (d) and the second mapping, modify said binding of said first plurality of CDN domain names to corresponding CDN clusters.

24. The device of claim 23, wherein said plurality of content provider domain names are mapped in a many-to-one relationship to said plurality of CDN hostnames.

\* \* \* \* \*